US011461144B2

(12) United States Patent
Tofts

(10) Patent No.: US 11,461,144 B2
(45) Date of Patent: Oct. 4, 2022

(54) ASSIGNMENT OF PROCESSES TO COMPUTATIONAL RESOURCES

(71) Applicant: HEWLETT PACKARD ENTERPRISE DEVELOPMENT LP, Houston, TX (US)

(72) Inventor: Chris Tofts, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 455 days.

(21) Appl. No.: 15/754,581

(22) PCT Filed: Oct. 21, 2015

(86) PCT No.: PCT/GB2015/053155
§ 371 (c)(1),
(2) Date: Feb. 22, 2018

(87) PCT Pub. No.: WO2017/068310
PCT Pub. Date: Apr. 27, 2017

(65) Prior Publication Data
US 2018/0267834 A1    Sep. 20, 2018

(51) Int. Cl.
*G06F 9/50*    (2006.01)
(52) U.S. Cl.
CPC ............ *G06F 9/505* (2013.01); *G06F 9/5038* (2013.01)
(58) Field of Classification Search
None
See application file for complete search history.

(56) References Cited

U.S. PATENT DOCUMENTS 8,108,521 B2 *  1/2012  Greven ............ G06Q 10/06316
                                             709/226
9,047,111 B2     6/2015  Breitgand et al.
(Continued)

OTHER PUBLICATIONS

A New Algorithm for Optimal Bin Packing, Richard E. Korf, Published in AAAI/IAAI 2002; Computer Science; [retrieved on Apr. 10, 2020]. Retrieved from the internet <URL: https://www.aaai.org/Papers/AAAI/2002/AAAI02-110.pdf> (Year: 2002).*
(Continued)

*Primary Examiner* — Meng Ai T An
*Assistant Examiner* — Zujia Xu
(74) *Attorney, Agent, or Firm* — Trop, Pruner & Hu, P.C.

(57) ABSTRACT

Method by which a plurality of processes are assigned to a plurality of computational resources, each computational resource providing resource capacities in a plurality of processing dimensions. Processing loads are associated in each processing dimension with each process. A loading metric is associated with each process based on the processing loads in each processing dimension. One or more undesignated computational resources are designated from the plurality of computational resources to host unassigned processes from the plurality of processes. In descending order of the loading metric one unassigned process is assigned from the plurality of processes to each one of the one or more designated computational resources. In ascending order of the loading metric any remaining unassigned processes are assigned from the plurality of processes to the one or more designated computational resources whilst there remains sufficient resource capacity in each of the plurality of processing dimensions.

14 Claims, 5 Drawing Sheets

(56) References Cited

U.S. PATENT DOCUMENTS

| 9,323,583 B2* | 4/2016 | Guillou | G06F 9/5083 |
|---|---|---|---|
| 2014/0089480 A1* | 3/2014 | Zhu | G06Q 10/06 |
| | | | 709/223 |
| 2014/0215073 A1 | 7/2014 | Dow | |
| 2014/0244212 A1* | 8/2014 | Allen-Ware | G01R 31/2851 |
| | | | 702/182 |
| 2015/0095521 A1* | 4/2015 | Hackborn | G06F 3/0673 |
| | | | 710/18 |
| 2017/0109199 A1* | 4/2017 | Chen | G06F 9/4881 |

OTHER PUBLICATIONS

Chandra Chekuri and Sanjeev Khanna, "On Multi-Dimensional Packing Problems," SIAM Journal on Computing, 2004, pp. 837-851, vol. 33, Issue 4, SIAM.

Gyorgy Dosa et al., "Tight Absolute Bound for First Fit Decreasing Bin-Packing: FFD (L) <11/9 OPT(L)+ 6/9," Theoretical Computer Science, 2013, pp. 13-61, vol. 510, Elsevier B.V.

International Search Report and Written Opinion, International Application No. PCT/GB2015/053155, dated Jun. 20, 2016, pp. 1-9, EPO.

Jingling Yuan et al., "An Online Energy Saving Resource Optimization Methodology for Data Center," Journal of Software, Aug. 2013, pp. 1875-1880, vol. 8, No. 8, Academy Publisher.

Mark Stillwell et al., "Virtual Machine Resource Allocation for Service Hosting on Heterogeneous Distributed Platforms," Feb. 7, 2012, pp. 1-12.

Rodrigo N. Calheiros et al., "A Heuristic for Mapping Virtual Machines and Links in Emulation Testbeds," Jul. 2, 2009, pp. 1-8.

* cited by examiner

ASSIGNMENT OF PROCESSES TO COMPUTATIONAL RESOURCES

BACKGROUND

Ever more powerful computing resources are loaded with ever more demanding loads, both in terms of tile number of processes and the toad requirements associated with each process. There is a consequential increase in the demand for efficiently allocating processes to computational resources.

BRIEF DESCRIPTION OF THE DRAWINGS

Disclosed arrangements are further described hereinafter by way of example and with reference to the accompanying drawings, in which.

DETAILED DESCRIPTION

Figure 1:
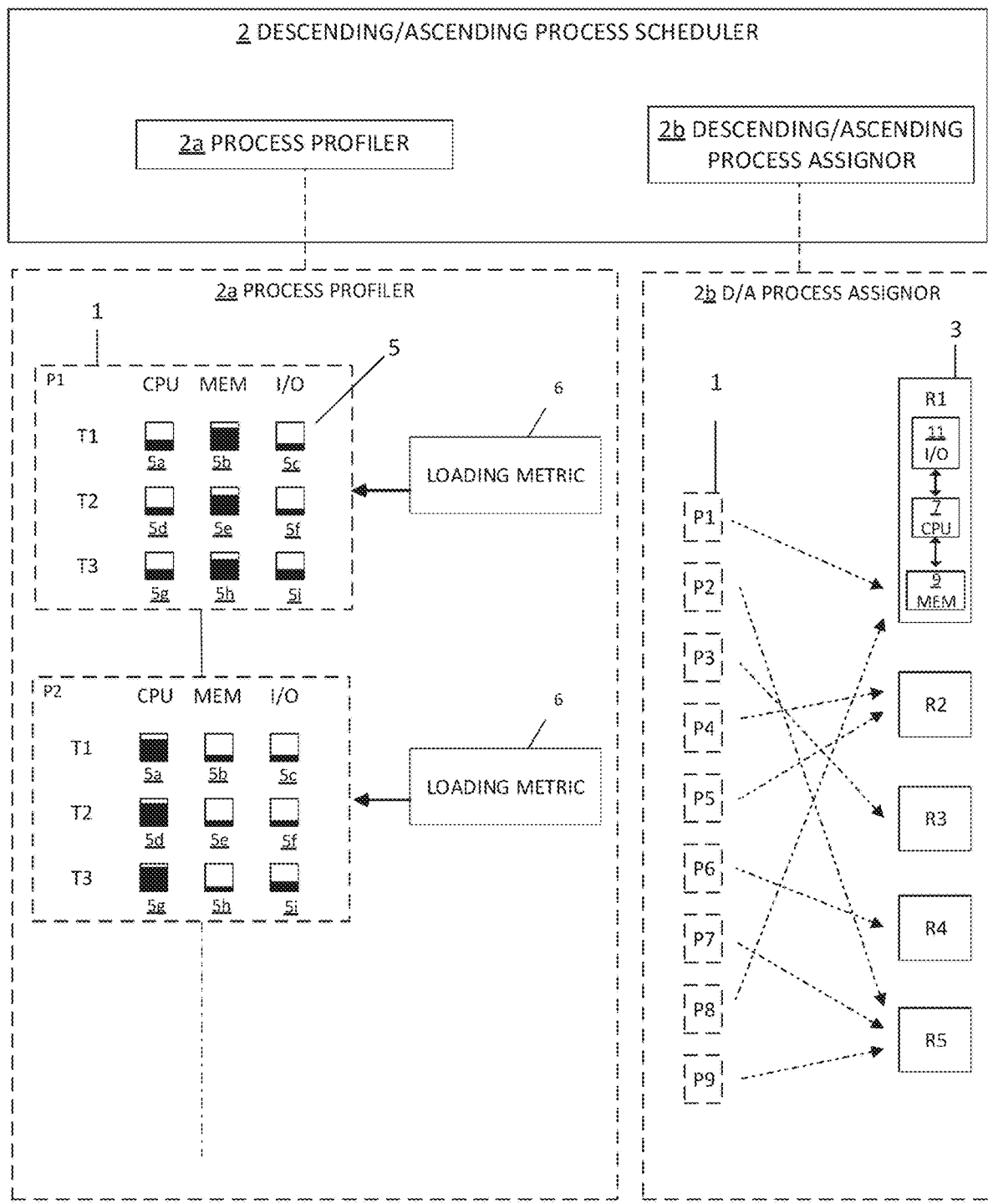
FIG. 1 depicts an example of a process scheduler for assigning multiple processes to multiple computational resources.

Hosting solutions can provide multiple computational resources for hosting multiple processes, which may involve assigning the processes to the computational resources, i.e. deciding which computational resource is to host any given process.

The particular loading of the computational resources is then dependent on the particular assignment of processes to those computational resources. Efficient assignment of processes to resources may involve avoiding excess and unused capacity in each computational resource, whilst meeting demand.

Inefficient assignment of multiple processes to multiple computational resources typically gives rise to increased cost associated with the provision of unused computational capacity in a hosting solution. For example, unused capacity can mean employing more processing resources than necessary, resulting in wasted space, power and other costs associated with the employment of the excess computational resources.

Increasing the efficiency of the allocation of multiple processes to multiple computational resources therefore facilitates reduced hosting cost.

In some examples, human operators have assigned processes to computational resources, but this is increasingly rendered infeasible owing to factors such as increased hosting complexity and scale—tens or even hundreds of thousands of processes can require mapping to hundreds or even thousands of computational resources.

Other examples may involve computational complexity that is NP, i.e. nondeterministic polynomial time, and employ exhaustive searching of different assignments to find an optimal assignment, which may be impractical to implement for large scale hosting services as they may involve infeasible computation and therefore infeasible lengths of time to complete. Additionally, use of extensive processing power to automate the assignment runs counter to the goal of seeking to increase efficiency in a hosting environment.

There is disclosed herein a method of assigning a plurality of processes to a plurality of computational resources, each computational resource providing resource capacities in a plurality of processing dimensions, the method comprising: associating processing loads in each processing dimension with each process; associating a loading metric with each process based on the processing loads in each processing dimension, and performing the following designations and assignments; designating one or more undesignated computational resources from the plurality of computational resources for hosting unassigned processes from the plurality of processes; assigning in descending order of the loading metric one unassigned process from the plurality of processes to each one of the one or more designated computational resources; and assigning in ascending order of the loading metric any remaining unassigned processes from the plurality of processes to the one or more designated computational resources whilst there remains sufficient resource capacity in each of the plurality of processing dimensions.

It has been found that the above method can provide an efficient, heuristic means to efficiently assign a plurality of processes to a plurality of resources, thereby facilitating the efficient allocation of the processes to the computational resources. The method is light in terms of computation and is thus scalable for assigning large numbers of processes to resources. Flipping from the assignment of processes in order of descending loading metric for each designated resource to the assignment of remaining unassigned processes in order of ascending loading metric for the designated resources has been found to give rise to efficient assignment, hence facilitating efficient allocation, of the processes.

There is also disclosed a method of assigning a plurality of processes to a plurality of computational resources, each computational resource providing a resource capacity, the method comprising: associating a processing load with each process; associating a loading metric with each process based on the processing load and, performing the following designations and assignments; designating one or more undesignated computational resources from the plurality of computational resources for hosting unassigned processes from the plurality of processes; assigning in descending order of the loading metric one unassigned process front the plurality of processes to each one of the one or more designated computational resources; and assigning in ascending order of the loading metric any remaining unassigned processes from the plurality of processes to the one or mom designated computational resources whilst there remains sufficient resource capacity.

Employing a single dimension for processing load and resource capacity reduces the computational expanse associated with the assignment, whilst retaining the efficiency of the assignment arising from the use of the reversal of the assignments from descending to ascending order of loading metric.

Whilst processes remain to be assigned to the plurality of computational resources, the designations and assignments may be performed iteratively. Iterative designation and assignment in which the assignments are initially ordered in terms of descending loading metric for each designated resource followed by subsequent ordering of assignments in terms of ascending loading metric for the designated resources has been found to provide efficient assignment of processes even in the case of a large numbers of processes and computational resources.

For the assignments made in ascending order of loading metric, the designated computational resource having the largest sum total remaining resource capacity taken across each of the processing dimensions may be selected and assignments may be made to the selected computational resource whilst there remains sufficient resource capacity in each or the plurality of processing dimensions of the selected designated computational resource. Whenever the currently selected designated computational resource has insufficient remaining resource capacity a re-selection may be made of the designated computational resource having the largest sum total remaining resource capacity taken across each of the processing dimensions and assignments may be made to the re-selected computational resource whilst there remains sufficient resource capacity in each of the plurality of processing dimensions of the re-selected computational resource.

The process scheduler may be arranged to assign respective unassigned processes in descending order to the one or more designated computational resources based on a defined order of the designated computational resources and to assign respective unassigned processes in ascending order to the one or more designated computational resources in or based on the defined order of the designated computational resources.

An estimation may be made of the number of computational resources required to host the unassigned processes thereby to determine the number of computational resources to designate for hosting unassigned processes from the plurality of processes. In a single-iteration approach, this helps mitigate against there remaining unassigned processes. In a multiple-iteration approach, this helps to reduce the number of iterations, reducing the computational expense of the assignment process.

The loading metric associated with each unassigned processes may be updated for each new iteration of the designations and assignments. This facilitates an increase in the efficiency of the assignment as the change in relative loading of the remaining unassigned processes once certain processes have been assigned is taken into account.

In the first iteration a plurality of computational resources may be designated and in subsequent iterations one computational resource may be designated. This has been found to offer an increase in the efficiency of the assignment process, especially in the case of large numbers of processes and computational resources.

The processing dimensions may characterize processing in terms of processing-forms and/or processing-times. The processing-form dimensions may comprise CPU, memory and input/output. By taking info account the processing lead in terms of different processing forms and processing-times and matching it up with computational resources providing certain capacities in corresponding processing dimensions, more efficient assignment is facilitated.

The total processing load in each processing dimension may be determined and the number of designated computational resources may be the minimum number of computational resources required to give sufficient resource capacity in the processing dimension having the highest total processing load. This has been found to offer an increase in assignment efficiency.

The loading metric associated with each process may be indicative of the relative processing load of each process in the processing dimension having the highest total processing load. This has been found to offer good assignment efficiency whilst reducing the computational requirements of the assignment process itself.

The loading metric associated with each process may be a function of the loadings in each processing dimension.

The loading metric associated with each process may be lexicographical based on the processing loads in each processing dimension of each process. This provides a computationally efficient way to rank the overall relative processing loads of processes and enables the processing dimensions to be weighted according to specified lexicographic preferences. Where processing-form dimensions are employed, the lexicographic preference may be such that CPU is most preferred, optionally followed by memory and/or input/output.

The loading metric associated with each process may be indicative of the relative combined processing loads in each processing dimension of each process. The relative combined processing load may be determined based on taking a weighted summation of the processing loads in each processing dimension of each process. Alternatively the relative combined processing load may be determined based on taking a weighted summation of the squares of the processing loads in each processing dimension of each process. Basing the loading metric on a relative combined load offers greater assignment efficiency at the expense of slightly increasing computational complexity of the assignment process itself.

The plurality of processes may be allocated to their assigned computational resources.

There is also disclosed a system for assigning a plurality of processes to a plurality of computational resources, each computational resource providing resource capacities in a plurality of processing dimensions and each process having an associated processing load in each processing dimension, the system comprising: a process scheduler arranged to assign the plurality of processes to the plurality of computational resources, wherein: the process scheduler is arranged to associate a loading metric with each process based on the processing loads in each processing dimension; and the process scheduler is arranged to perform the following designations and assignments; designate one or more undesignated computational resources from the plurality of computational resources for hosting unassigned processes from the plurality of processes; assign in descending order of the loading metric one unassigned process from the plurality of processes to each one of the one or more designated computational resources; and assign in ascending order of the loading metric any remaining unassigned processes from the plurality of processes to the one or more designated computational resources whilst there remains sufficient resource capacity in each of the plurality of processing dimensions.

The process scheduler may be arranged such that, whilst processes remain to be assigned to the plurality of computational resources, the designations and assignments are performed iteratively.

The process scheduler may be arranged to update the loading metric associated with each unassigned process for each new iteration of the designations and assignments.

The computational resources may comprise processor cores forming part of a multi-core processor. Thus processes can be rapidly reassigned and thus reallocated to different cores of the processor without employing undue computation associated with the assignment process itself.

The computational resources may comprise separate central processing units.

There is also disclosed non-transitory machine readable storage storing machine executable code arranged, when executed, to assign a plurality of processes to a plurality of computational resources; each computational resource providing resource capacities in a plurality of processing dimensions, the assignment comprising: associating processing loads in each processing dimension with each process; associating a loading metric with each process based on the processing loads in each processing dimension, and, performing the following designations and assignments; designating one or more undesignated computational resources from the plurality of computational resources for hosting unassigned processes from the plurality of processes; assigning in descending order of the loading metric one unassigned process from the plurality of processes to each one of the one or more designated computational resources; and assigning in ascending order of the loading metric any remaining unassigned processes from the plurality of processes to the one or more designated computational resources whilst there remains sufficient resource capacity in each of the plurality of processing dimensions.

FIG. 1 illustrates an example of a descending/ascending process scheduler 2. In this example there is shown as part of the descending/ascending process scheduler 2 a distinct process profiler 2a and a distinct descending/ascending process assignor 2b. However, the descending/ascending process scheduler 2 can be implemented without a distinct process profiler and/or a distinct descending/ascending process assignor.

There is shown a sat of processes 1, P1 to P9, to be assigned to a set of computational resources 3, R1 to R5. A process 1 refers to computational operations to be executed by a computational resource 3 to which the process 1 is assigned. There is shown in the figure an example of a possible assignment of the processes 1 to the computational resources 3. There is no particular significance of the particular assignments shown in the figure; the particular assignments shown are intended merely to provide an illustrative example of a possible assignment of all of the processes 1 to the computational resources 3. Examples described herein comprise assigning the processes 1 to the computational resources 3 and, for example, efficiently establishing assignments that give rise to efficient loading of the computational resources 3.

In FIG. 1 there is shown nine processes 1, P1 to P9, and five computational resources 3, R1 to R5. The number of processes 1 and computational resources 3 shown is purely illustrative. Examples described herein may assign a plurality of processes 1 to a plurality of computational resources 3. The number of processes 1 and/or the number of computational resources 3 may be for example: greater than 10; greater than 100; or greater than 1000. In order to efficiently load processes 1 to computational resources 3, account is taken of the computational requirements of each process 1 and the processes 1 distributed across the computational resources 3 accordingly. The particular mechanism through which the relative loadings of each process 1 is taken into account shall now be described with references to FIGS. 1 to 3.

Processing dimensions 5 shown in FIG. 1 may be characterization metrics of processing. Although FIG. 1 depicts nine such processing dimensions 5, 5a to 5i, the number of processing dimensions 5 may be any number greater than zero. For example, the number of processing dimensions may be: 1; greater than 2; greater than 3; greater than 20; 24 or greater; greater than 25; 72 or greater; or greater than 100.

One processing dimension may be employed, as opposed to a plurality of processing dimensions. This reduces the computational expense associated with the assignment process at the expense of ultimate assignment efficiency, yet in certain cases the use of the methodology described herein may nevertheless provide a satisfactory ultimate assignment efficiency.

That said, more than the processing dimension 5 may be employed. Employing more than one processing dimension 5 facilitates improved characterization of the processes 1, facilitating improved assignment efficiency.

The benefits of employing more than one processing dimension 5 may be understood by way of the following analogy. When loading automobiles with a large number of boxes, it would be difficult to pack the automobiles efficiently were only a single characterization dimension to be employed. Supposing only the width of every box and every automobiles were to be measured; then owing to limited characterization of the boxes and automobiles, it would be difficult to efficiently assign boxes to automobiles for the mason that the height, depth and weight of each box end height, depth and weight-capacity of each automobile has not been characterized. By characterizing end factoring in these additional dimensions, it is possible to more efficiently assign the boxes to the automobiles by taking into account the additional information. In a similar way, processes 1 and computational resources 3 are better characterized by employing more than one characterization of the processing; processes 1 have different CPU, memory, I/O utilization that may vary with time.

Characterization in terms of CPU, memory, I/O and time, as shown in FIG. 1, offers lightweight yet reasonably comprehensive characterization. Different or additional characterizations could be employed, e.g.; algorithmic complexity; network bandwidth; number of threads; dominant processing type, etc.

Each of the processing dimensions 5a-i shown in FIG. 1 correspond with processing of a specific processing-form at a specific processing-time, e.g.; processing dimension 5a corresponds with the loading of the CPU at time Tl; processing dimension 5d corresponds with the utilization of the CPU at time T2; processing dimension 5h corresponds with the utilization of memory at time T3; processing dimension 5f corresponds with the utilization of input/output at time T2, etc.

As stated, the number of processing dimensions 5 is not fixed and may be chosen to suit a particular scenario to provide adequate characterization of the processes 1 and computational resources 3. For example, networking bandwidth may play a significant role in certain applications, and no role in other applications.

The loadings may correspond with peak loadings across a particular time period. For example, the labels T1, T2 and T3 may correspond with 8 hour time periods taken over a 24 hour period. Alternatively the loadings may be representative of an average load taken across the time period. If CPU, memory and input/output is considered each hour over a 24-hour period, there are 72 processing dimensions in total. Employing processing dimensions greater than or equal to 72 have been found to facilitate excellent assignment efficiency owing to the more detailed characterization of the processes 1.

Again, the particular form of the processing dimensions 5 can be varied to suit the particular application. Some applications may require different time periods, forms of processing or other characterization metrics associated with the processing. For the purpose of the assignment methodology described in the present disclosure, multiple characterization metrics may be associated with the loading of the given processes 1 and have corresponding resource capacities associated in each of the same processing dimensions of the computational resources 3.

FIG. 1 also shows an example of a computational resource 3, see resource R1 in relation to which extra detail is provided. In the example shown, the computational resource 3 has a processor 7, memory 9 and input/output 11. The processor 7 interacts with the memory 9 and input/output 11. This computational resource thus provides capacities in terms of processing, memory and input/output These capacities may or may not be time-varying. The form of resource shown here is merely illustrative; the resource may provide one or more of the same or other forms of processing capacity, e.g. network, graphics processor, etc.

Regardless of the particular choice of processing dimensions 5, i.e. number and particular characterizations, the processes 1 can have particular processing loads associated with them. In the processing dimensions Thus in each processing dimension a numeric metric can be associated with each process 1 representative of the processing load in that processing dimension 5. In the same way, a numeric metric representative of the capacities of the computational resources 3 can be provided in each of the processing dimensions 5. It is desirable that the units employed for loadings and capacities are the same, e.g. a capacity of 20 is able to provide for 4 processors having a load of 5. Of course, for a computational resource 3 to host a process 1, it must have sufficient capacity in each of the processing dimensions 5, not just in one processing dimension.

Conveniently, where the computational resources each provide a minimum resource capacity in each of the processing dimensions, such as in the case when all the computational resources are substantially the same, the loadings in each of the processing dimensions 5 for each process 1 may be normalized in terms of a scalar value from 0 to 1 indicative of the proportion of the capacity of one single computational resource 3 required by the process 1. Thus a scalar value of 0.5 in a particular processing dimension 5 would indicate that a process 1 utilizes 50% of a computational resource in that processing dimension 5.

FIG. 1 shows example processes 1, P1 and P2. The processing loads in each processing dimension 5 have been normalized so as to correspond with the proportion of the capacities of the computational resources 3 in each of the processing dimensions 5 that are required by the processes. It can readily be seen that process P1 is highly memory-intensive, whereas process P2 is highly CPU-intensive.

Having now described the manner in which the loadings of the processes 1 are characterized against capacities of the computational resources 3 for the purpose of facilitating efficiently assigning the processes 1 to the computational resources 3, a method of assigning the plurality of processes to the plurality of computational resources shall now be described.

Figure 2:
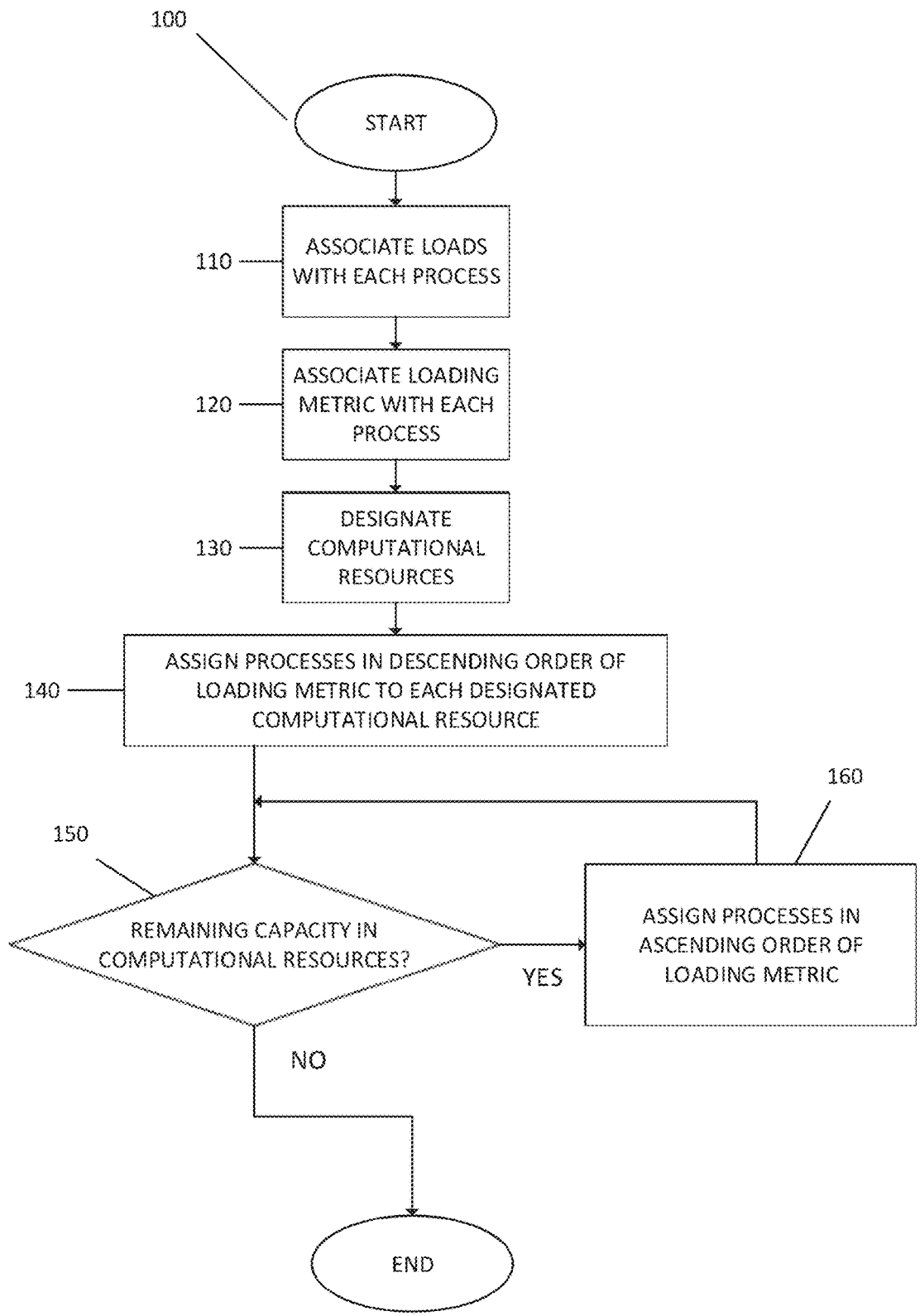
FIG. 2 depicts ah example method of assigning multiple processes to multiple computational resources.

With reference to FIG. 2, an example method of assigning a plurality of processes to a plurality of computational resources shall now be described.

In the illustrated method it is assumed that the computational resources already have capacities associated with them in a plurality of processing dimensions. However, the method could also comprise associating resource capacities in each of the plurality of processing dimensions of each of the computational resources 3.

The methods shown herein could be implemented using the descending/ascending process schedulers illustrated in FIG. 1.

In the method of FIG. 2, 110 and 120 could be performed by the process profiler 2a, whilst steps 130 to 16 could be performed by the descending/ascending process assignor 1.

The descending/ascending process scheduler 2 may be implemented by way of a processor interacting with a memory. A list of processes 1 and computational resources 3 may be stored in the memory. Alternatively, the descending/ascending process scheduler 2 may access lists of processes 1 and computational resources 3 provided on an external storage medium or using a communications interface.

In 110 processing loads in each processing dimension are associated with each process. These processing loads in each processing dimension may already be known or may be determined. The processing loads in each processing dimension may be determined by measuring the processes using hardware or software profiling tools. Alternatively processing loads may be assigned based on known information about the processes 1.

Processing loads in each processing dimension may be assigned to the processes 1 by profiling source code associated with each of the processes 1. Alternatively, a processing load in at least one processing dimension may be assigned to the processes 1 by analyzing source code associated with each of the processes 1. The profiling may be software-based. Analyzing the source code of the processes 1 can be employed to conveniently determine in an offline fashion the partial or complete loading characterizations of the processes 1 by considering the structure of the software code, repetitions of function calls, number of variables, etc. This loading can then be associated with one or each of the processing loads in the processing dimensions 5 of the processes 1. Thus analysis of the software coda may be employed to partly or fully characterize the processing requirements of the processes 1.

In 120, a loading metric indicative of the overall loading of a process is associated with each process 1 based on the processing loads in each processing dimension. A higher loading metric reflects greater determined overall loading by a process 1. This loading metric provides a means of ranking the processes 1 according to their determined relative overall loadings Thus when ordered in terms of descending loading metric, i.e. highest to lowest, the first process 1 is deemed to provide the highest overall loading and the last process 1 is deemed to provide the lowest overall loading. Conversely, when ordered in terms of ascending loading metric, i.e. lowest to highest, the first process 1 is deemed to provide the lowest overall loading and the last process 1 is deemed to provide the highest overall loading.

For processing loads across a number of different processing dimensions, the particular technique that is used to allocate a loading metric to each process based on the processing loads in each of the processing dimensions 5 associated with each process may take a number of different forms. The loading metric may be a function of the loadings in each processing dimension 5. For example, a weighted summation of all the loadings of a process 1 in each of the processing dimensions 5 may be taken to form the loading metrics for each of the processes 1. Other loading metrics may be employed in order to rank the processes 1 in terms of their relative overall loadings of a computational resource 3.

The loading metric may be lexicographical, i.e. the processes 1 are lexicographically ordered according to a certain lexicographic preference in respect of processing dimensions 5. Thus in much the same way as words are sorted in a dictionary initially by first letter (most lexicographically preferred), followed by second letter (second-most lexicographically preferred), etc., the processes 1 may be sorted by a first preferred processing dimension 5, followed by a second-most preferred processing dimension 5, etc. The first most lexicographically preferred processing dimension may be CPU. The second most lexicographically preferred processing dimension may be memory. The third most lexicographically preferred processing dimension may be input/output. Whatever the particular forms of processing dimension 5 that are employed, one benefit of lexicographical ordering is that the relative importance of the processing dimensions 5 can be reflected by virtue of the lexicographical preference employed in the ordering process.

Whatever the particular loading metric that is employed, the loading metric is indicative of the overall loading of any given process. The loading metric can thus be used to rank the processes 1 by overall loading. Thus a process 1 with a loading metric of 10 is deemed to impose a greater overall loading than another process 1 with a loading metric of 5, and vice versa.

In 130, one or more computational resources 3 are designated for hosting processes 1. A fixed number of designations may be made. This can reduce the computational requirement of the assignment method. Alternatively, designations may be made based on an estimated number of additional computational resources 3 required to host the unassigned processes 1. This estimation may be performed in various different ways, for example, a summation may be made across all the loads of the processing dimensions 5 of all of the remaining unassigned processes 1. The highest total load may be used to determine the number of computational resources 3 required to satisfy that load in that processing dimension 5. Optionally the loading metric may be taken to be the processing load in that processing dimension of each remaining unassigned process.

Then, in 140, processes are assigned in descending order of loading metric, i.e. highest overall loading first, to the designated computational resources, respectively. Thus, for each of the designated computational resources, the most highly ranked process is assigned to the first designated computational resource, followed by the second-most highly ranked process being assigned to the second designated computational resource, followed by the third-most highly ranked process being assigned to the third designated computational resource, etc.

Next, in 150, once all of the designated computational resources have had a process assigned to them, a check is made whether there is remaining resource capacity in the designated computational resources to host unassigned processes and, whilst there is processes are then assigned to the designated computational resources in ascending order of the loading metric for the processes. Thus, the lowest ranked process (i.e., having the lowest loading metric among the unassigned processes) is assigned to one of the designated computational resources, followed by assigning the second-most lowly ranked process (i.e., having the lowest loading metric among the unassigned processes after assignment of the previously lowest) to one of the designated computational resources, followed by the third-most lowly ranked process, etc.

For the assignment of a process, a selection may be made of a designated computational resource to host the process, which selection may be either confirmed when it is established that the selected designated computational resource has sufficient remaining capacity to host the process or rejected when it is established that the selected designated computational resource has insufficient remaining capacity to host the process.

The designated computational resources may be placed in a defined order for the assigning of processes, such that the processes are assigned in descending order (as described in relation to 140) to respective designated computational resources in or based on the defined order (subject to confirmation or rejection as described above), and such that other processes are subsequently assigned in ascending order (as described in relation to 160) to respective designated computational resources in or based on the defined order (subject to confirmation or rejection as described above). For example, referring to the example of FIG. 1, the computational resources may be ordered R1, R2, R3, R4, and R5, and schedulers may assign processes in descending order, as described above, such that the highest-ranked process is assigned to R1, then next highest ranked processes is assigned to R2, etc., and subsequently scheduler 2 may assign processes in ascending order, as described above, such that the lowest-ranked process is assigned to R1, then the next-lowest process is assigned to R2, etc.

The designated computational resources may be placed in descending order according to a sum total remaining resource capacity and, following 140, that ordering may be retained for 160 such that for the assignment of each process, a selection is made of the first not previously rejected designated resource, which selection is confirmed once a designated resource having sufficient remaining capacity to host the process is selected.

Alternatively, the selection of the designated resource from the one or more designated resources may be random, excluding previously rejected selections. As a further alternative, a selection may be made of the the designated computational resource having the greatest sum total remaining resource capacity taken across each processing dimension 5, excluding previously rejected selections. As a further alternative, for each process being assigned, an identification may be made of the processing dimension 5 of the process being assigned having the highest load, and a selection may be made of the designated computational resource having the greatest remaining resource capacity in the identified processing dimension 5, excluding previously rejected selections.

When there is no remaining capacity in the designated computational resources 3, the method is completed.

It has been found that by initially assigning the most highly ranked processes 1 to different designated computational resources 3, followed by assigning in reverse-order starting with the lowest-ranked process 1, and moving onto the next-most lowest-ranked process 1 etc, in this way leads to an efficient assignment of the processes 1 to the computational resources 3. Furthermore, this procedure has been found to involve a sufficiently small degree of processing power that it can be sealed for a very large number of processes 1 and computational resources 3.

Figure 3:
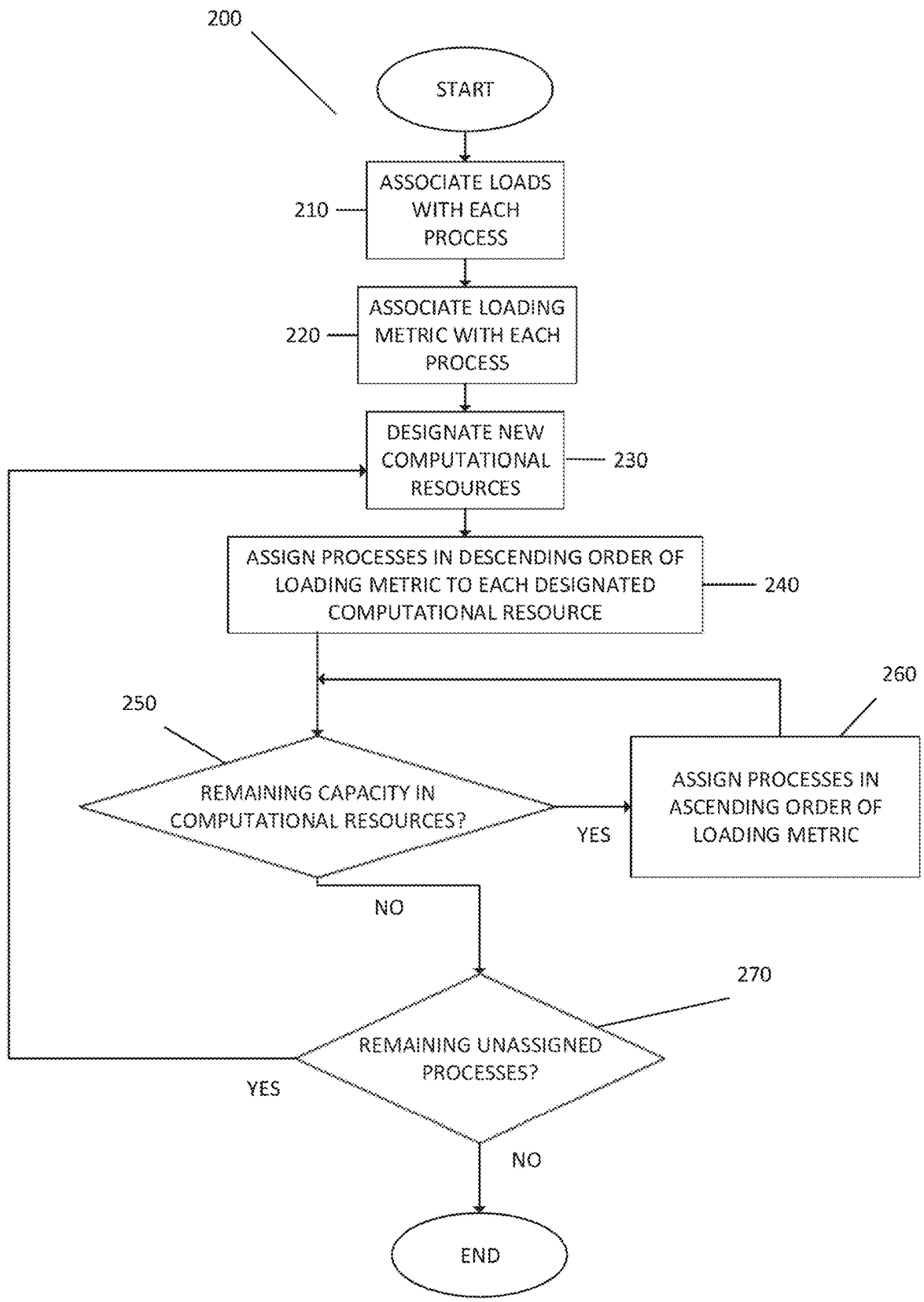
FIG. 3 depicts an example method of assigning multiple processes to multiple computational resources employing iterative operations.

FIG. 3 shows a variation of the above-described method in which the designations and assignments are performed iteratively whilst there remains processes to be assigned. As for method 100, method 200 can be performed using the descending/ascending process scheduler 2 shown in FIG. 1. In such examples, 210 to 220 may be performed using the process profiler 2a and steps 230 to 270 may be performed using the descending/ascending assignor 2b.

FIG. 3, 210-260 may correspond to the functionalities described above in relation to 110-160 of FIG. 2. In 270, a check is made as to whether there are remaining unassigned processes 1 and whilst there are, the method continues from the designation 230 and proceeds in the same manner described above with respect to s 130 to 180.

For each iteration, a fixed or varying number of designations may be made. The number of designations may be set to the estimated minimum number of computational resources 3 required to host the processes 1, as described above. Alternatively, a fixed number may be set. Alternatively, one designation may be made in each iteration; or, in the first iteration a plurality of designations may be made, and in subsequent iterations a single designation may be made.

The loading metric may itself be updated in each iteration. By recalculating the loading metric across iterations, better account is taken of the remaining processing requirements of the unassigned processes 1, giving a potential increase in the loading efficiency of the processes 1 onto the computational resources 3. In this case, new iterations would begin with 220, rather than 230.

Any one of the methodologies concerning the ordering of the designated resources to which assignments are made and selection of the designated resources described above in connection with process 100 may be applied with respect to each iteration of process 200.

The above-described methodologies are described in terms of assigning processes 1 to computational resources 3. Based on these assignments, the processes 1 may then be allocated onto the computational resources 3 for execution. Efficient assignment facilitates efficient allocation.

It will readily be appreciated that the above-described methodologies could be performed for processes that are already running on an existent hosting platform so as to re-host the processes 1 on the same or a now hosting platform more efficiently. In this way the number of computational resources 3 in a hosting solution may be reduced as redundancy is eliminated. Alternatively, processes 1 that are not currently being executed may be assigned for future allocation and processing by the computational resources 3.

With respect to each of the above-described assignment methodologies, optionally the computational resources are loaded up to a specified proportional limit of the resource capacity in each processing dimension. Thus in 150 and 250, the check could further include ensuring that remaining resource capacities in each processing dimension of each computational resource exceeds a predetermined minimum proportion of the resource capacity Loading up to no greater than 85% of each computational resource may, in certain applications, offer a safety margin to safeguard against bottlenecks arising from a temporary overload of a computational resource.

Figure 4:
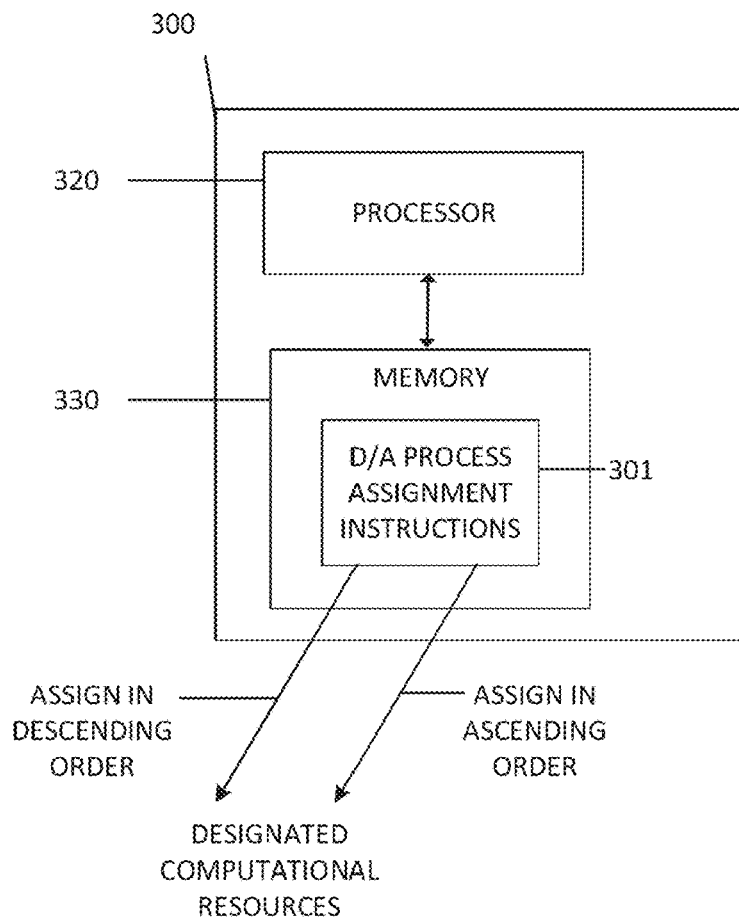
FIG. 4 depicts an example of a system for assigning multiple processes to multiple computational resources.
Figure 5:
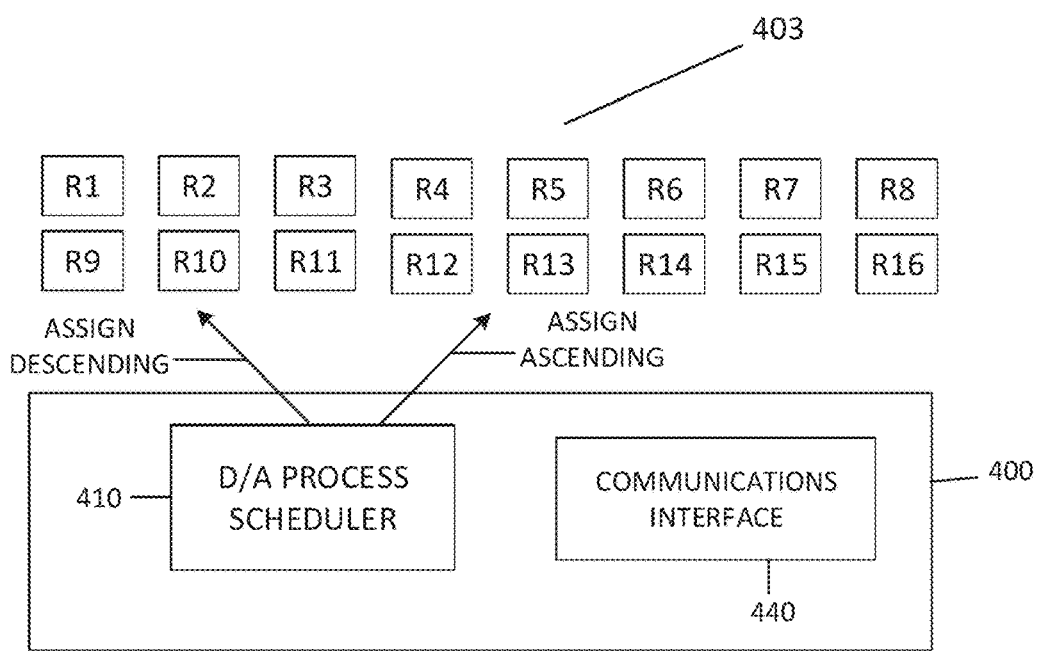
FIG. 5 depicts an example system for assigning multiple processes to multiple computational resources that are external to the system.
Figure 6:
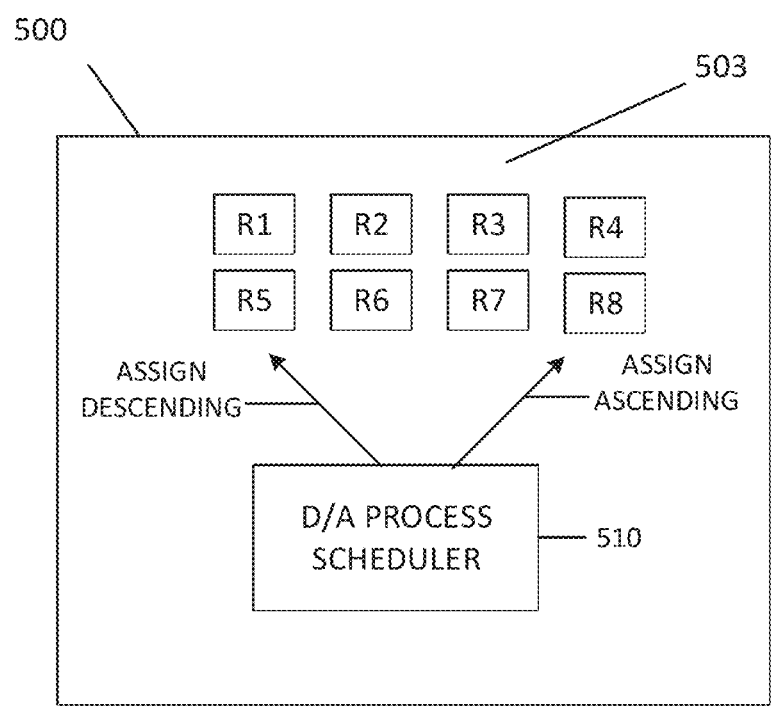
FIG. 6 depicts an example system for assigning multiple processes to multiple computational resources that are included within the system.

The descending/ascending process scheduler 2 may be implemented by at least one computing device and may comprise any combination of hardware and programming to implement the functionalities of the scheduler described herein. In examples described herein, such combinations of hardware and programming may be implemented in a number of different ways. For example, the programming for the scheduler may be processor executable instructions stored on at least one non-transitory machine-readable storage medium and the hardware for the scheduler may include at least one processing resource to execute those instructions to perform the functionalities of the scheduler. In some examples, the hardware may also include other electronic circuitry to at least partially implement the scheduler. FIGS. 4 to 6 provide a few non-limiting examples of such possible implementations.

FIG. 4 shows a system 300 for assigning a plurality of processes 1 to a plurality of computational resources 3. The system 300 comprises at least one processor 320 and memory 330 storing descending/ascending assignment instructions 301 that, when executed by the at last one processor 320, may assign unassigned processes to designated resources in accordance with any one of the descending/ascending methodologies described above in relation to FIGS. 1-3 or below in relation to FIGS. 5-6. Although not shown, the system 300 may have a communications interface for accessing a list of processes 1 and computational resources 3.

FIG. 5 shows a system 400 comprising a descending/ascending process scheduler 410. The process scheduler 410 may be implemented by means of a dedicated process scheduler circuit. By providing a dedicated circuit, the process scheduler 410 may be separated from, and avoid loading, existing computational resources. The system 400 is also shown as having a communications interface 440 which may be provided to access from an external source processes 1 and/or computational resources 3 and thereby provide a list of processes 1 and/or computational resources 3, or which may be provided to access from an external source an already generated list of processes 1 and/or computational resources 3, or which may access from an external source the characterizations of the processes 1 and computational resources 3.

In some examples, descending/ascending process scheduler 410 may assign unassigned processes to designated resources in accordance with any one of the descending/ascending methodologies described above. In some examples, descending/ascending process scheduler 410 may perform any of the functionalities described above in relation to descending/ascending process scheduler 2, for example. In some examples, system 400 may be implemented by at least one computing device and descending/ascending process scheduler 410 may comprise any combination of hardware and programming to implement its functionalities, as described above.

There is shown in FIG. 6, a system 500 comprising computational resources 503 and a descending/ascending process scheduler 510 in the system 500 for assigning processes 1 to the computational resources 503. The computational resources 503 could be provided, at least in part, by cores of a multi-core processor. In some examples, descending/ascending process scheduler 510 may assign unassigned processes to designated resources in accordance with any one of the descending/ascending methodologies described above. In some examples, descending/ascending process scheduler 510 may perform any of the functionalities described above in relation to descending/ascending process scheduler 2, for example. In some examples, system 500 may be implemented by at least one computing device and descending/ascending process scheduler 510 may comprise any combination of hardware and programming to implement its functionalities, as described above.

Throughout the description and claims of this specification, the words "comprise" and "contain" and variations of them mean "including but not limited to", and they am not intended to and do not exclude other moieties, additives, components, integers or s. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example are to be understood to be applicable to any other aspect, embodiment or example described herein unless incompatible therewith. All of the features disclosed in this specification including any accompanying claims, abstract and drawings, and/or all of the slaps of any method or process so disclosed, may be combined in any combination, except combinations where at least some of such features and/or steps are mutually exclusive. Examples described herein ere not restricted to the details of any foregoing embodiments. The invention extends to any novel one, or any novel combination, of the features disclosed in this specification including any accompanying claims, abstract and drawings, or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method comprising:
   determining processing loads in each of a plurality of processing dimensions;
   analyzing source code associated with a plurality of processes to associate processing loads in each processing dimension of the plurality of processing dimensions with each process of the plurality of processes;
   associating a loading metric of a plurality of loading metrics with each process of the plurality of processes based on the processing loads in each processing dimension, wherein the plurality of loading metrics are initially ordered according to a loading metric ranking;
   performing designations and assignments, iteratively, including, for each iteration of a plurality of iterations:
      designating a plurality of undesignated computational resources from the plurality of computational resources for hosting a plurality of unassigned processes from the plurality of processes;
      first assigning unassigned processes of the plurality of unassigned processes to designated computational resources of the plurality of designated computational resources based on a descending order of the loading metric ranking, wherein the first assigning comprises assigning a most highly ranked unassigned process of the unassigned processes to a first designated computational resource of the designated computational resources;
      subsequent to the first assigning, second assigning remaining unassigned processes of the unassigned processes to the designated computational resources based on an ascending order of the loading metric ranking and whilst there remains sufficient resource capacity in each processing dimension of the plurality of processing dimensions, wherein the assigning subsequent to the first assigning assigns a first lowest ranked unassigned process of the remaining unassigned processes to the first designated computational resource; and
      in response to the unassigned processes of the plurality of processes remaining to be assigned to the plurality of computational resources after the each iteration, updating and re-ordering the loading metric of the plurality of loading metrics associated with each unassigned processes for a subsequent iteration of the plurality of iterations; and
   executing each process of the plurality of processes based on the designations and assignments.

2. The method according to claim 1, wherein the plurality of processing dimensions characterize processing in terms of processing-types and processing-times.

3. The method according to claim 1, wherein the number of the plurality of undesignated computational resources comprises a minimum number of computational resources of the plurality of computational resources providing sufficient resource capacity in a processing dimension of the plurality of processing dimensions having a highest total processing load.

4. The method according to claim 1, wherein the loading metric indicates combined processing loads in each processing dimension of the plurality of processing dimensions of the associated process.

5. The method according to claim 1, further comprising:
   determining, for each process of the plurality of processes, a combined processing load based on a weighted summation of the processing loads associated with each processing dimension of the plurality of processing dimensions; or
   determining, for each process of the plurality of processes, the combined processing load based on a weighted summation of squares of the processing loads associated with each processing dimension of the plurality of processing dimensions.

6. The method according to claim 1, further comprising allocating the plurality of processes to their assigned computational resources.

7. A system capacities comprising:
   a processor; and
   a memory storing instructions that when executed cause the processor to:
      assign a plurality of processes to a plurality of computational resources, wherein each computational resource of the plurality of computational resources provides resource capacities in a plurality of processing dimensions, and each process of the plurality of processes has an associated processing load in each processing dimension of the plurality of processing dimensions;
      analyze source code associated with the plurality of processes to associate a loading metric of a plurality of loading metrics with each process of the plurality of processes based on the plurality of processing loads in each processing dimension of the plurality of processing dimensions, wherein each loading metric of the plurality of loading metrics are initially ordered according to a loading metric ranking indicating a processing load associated with a process of the plurality of processes to each process of the plurality of processes in the associated processing dimension;
      perform designations and assignments iteratively, including, for each iteration of a plurality of iterations:
         designating a plurality of undesignated computational resource from the plurality of computational resources for hosting unassigned processes from the plurality of processes;
         first assigning assign unassigned processes of the plurality of unassigned processes to designated computational resources of the plurality of designated computational resources based on a descending order of the loading metric ranking, wherein the first assigning comprises assigning a most highly ranked unassigned process of the unassigned processes to a first designated computational resource of the designated computational resources;

subsequent to the first assignment, second assigning any remaining unassigned processes of the unassigned processes to the designated computational resources based on an ascending order of the loading metric ranking and whilst there remains sufficient resource capacity in each processing dimension of the plurality of processing dimensions, wherein the assigning subsequent to the first assigning assigns a first lowest ranked unassigned process of the remaining unassigned processes to the first designated computational resource; and in response to the unassigned processes of the plurality of processes remaining to be assigned to the plurality of computational resources after the each iteration, updating and re-ordering the loading metric of the plurality of loading metrics associated with each unassigned processes for a subsequent iteration of the plurality of iterations; and execute each process of the plurality of processes based on the designations and assignments.

8. The system of claim 7, wherein the plurality of computational resources comprises a plurality of processor cores of a multi-core processor.

9. The system according to claim 7, wherein the plurality of computational resources comprise a plurality of separate central processing units.

10. The system according to claim 7, wherein the instructions when executed further cause the processor to:

determine, for each process of the plurality of processes, a combined processing load based on a weighted summation of the processing loads associated with each processing dimension of the plurality of processing dimensions; or determine, for each process of the plurality of processes, the combined processing load based on a weighted summation of squares of the processing loads associated with each processing dimension of the plurality of processing dimensions.

11. A non-transitory machine-readable storage medium that stores machine-executable instructions that, when executed by a machine, cause the machine to:

assign a plurality of processes to a plurality of computational resources, wherein each computational resource of the plurality of computational resources provides resource capacities in a plurality of processing dimensions, and each process of the plurality of processes has an associated processing load in each processing dimension of the plurality of processing dimensions;

analyze source code associated with the plurality of processes to associate a loading metric of a plurality of loading metrics with each process of the plurality of processes based on the plurality of processing loads in each processing dimension of the plurality of processing dimensions, wherein each loading metric of the plurality of loading metrics are initially ordered according to a loading metric ranking indicating a processing load associated with a process of the plurality of processes to each process of the plurality of processes in the associated processing dimension;

perform designations and assignments iteratively, including, for each iteration of a plurality of iterations:

designating a plurality of undesignated computational resource from the plurality of computational resources for hosting unassigned processes from the plurality of processes;

first assigning unassigned processes of the plurality of unassigned processes to designated computational resources of the plurality of designated computational resources based on a descending order of the loading metric ranking, wherein the first assigning comprises assigning a most highly ranked unassigned process of the unassigned processes to a first designated computational resource of the designated computational resources;- subsequent to the first assigning, second assigning remaining unassigned processes of the unassigned processes to the designated computational resources based on an ascending order of the loading metric ranking and whilst there remains sufficient resource capacity in each processing dimension of the plurality of processing dimensions, wherein the assigning subsequent to the first assigning assigns a first lowest ranked unassigned process of the remaining unassigned processes to the first designated computational resource; and in response to the unassigned processes of the plurality of processes remaining to be assigned to the plurality of computational resources after the each iteration, updating and re-ordering the loading metric of the plurality of loading metrics associated with each unassigned processes for a subsequent iteration of the plurality of iterations; and execute each process of the plurality of processes based on the designations and assignments.

12. The non-transitory machine-readable storage medium according to claim 11, wherein the loading metric indicates combined processing loads in each processing dimension of the plurality of processing dimensions of the associated process.

13. The non-transitory machine-readable storage medium according to claim 11, wherein the instructions, when executed by the machine, further cause the machine to allocate the plurality of processes to their assigned computational resources.

14. The non-transitory machine-readable storage medium according to claim 11, wherein the instructions, when executed by the machine, further cause the machine to:

determine, for each process of the plurality of processes, a combined processing load based on a weighted summation of the processing loads associated with each processing dimension of the plurality of processing dimensions.

* * * * *